Figure 1:
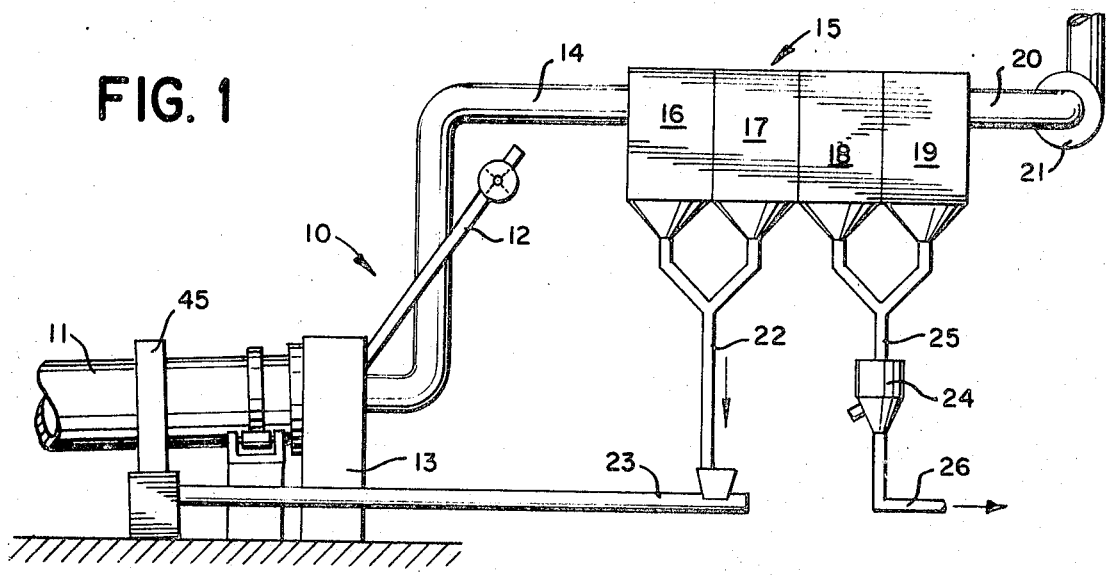

United States Patent

Heilmann

[15] 3,638,400
[45] Feb. 1, 1972

[54] SEPARATION OF ALKALI-RICH DUST FROM CEMENT KILNS

[72] Inventor: Thorbjorn Heilmann, Copenhagen-Valby, Denmark

[73] Assignee: F. L. Smidth & Co., New York, N.Y.

[22] Filed: Feb. 14, 1969

[21] Appl. No.: 805,937

Related U.S. Application Data

[63] Continuation of Ser. No. 566,547, July 20, 1966, abandoned.

[30] Foreign Application Priority Data

July 22, 1965  Denmark..............................31330/65

[52] U.S. Cl.........................................55/69, 23/25, 23/66, 23/89, 23/121, 55/71, 55/72, 55/73, 55/82, 55/135, 55/136, 55/267, 55/341, 55/342, 55/428, 55/466, 209/12, 209/127, 209/134, 209/233, 263/32 R, 263/53 R, 266/18
[51] Int. Cl.........................................B01d 46/02, B03c 3/01
[58] Field of Search................55/6, 124, 126, 134, 135, 315, 55/267, 268, 269, 342, 343, 345, 350, 428, 466, 69, 71, 72, 73, 82, 136, 341; 209/12, 21, 127, 134, 233; 263/21, 32, 533; 23/25, 66, 89, 121; 266/18

[56] References Cited

UNITED STATES PATENTS

| 1,185,136 | 5/1916 | Seaman.................................55/315 X |
| 1,793,499 | 2/1931 | Lindhard...........................55/466 UX |
| 2,125,263 | 8/1938 | Ahlmann.................................263/53 |
| 2,477,262 | 7/1949 | Mooser.................................263/53 X |
| 2,631,968 | 3/1953 | Peery.....................................209/21 X |
| 2,659,449 | 11/1953 | Kaiser et al. ..........................263/53 X |
| 2,687,292 | 8/1954 | Garoutte et al..........................263/53 |
| 2,750,182 | 6/1956 | Petersen...........................55/267 UX |
| 2,882,033 | 4/1959 | Smith.....................................263/53 |
| 3,110,483 | 11/1963 | Baxa.......................................263/53 X |
| 3,110,751 | 11/1963 | Bade.........................................263/53 |
| 3,206,526 | 9/1965 | Rygaard...............................263/53 X |
| 3,212,764 | 10/1965 | Muller et al..........................263/53 X |
| 3,250,520 | 5/1966 | Corson et al..........................263/53 X |

FOREIGN PATENTS OR APPLICATIONS

714,367  7/1965  Canada...................................55/127

Primary Examiner—Dennis E. Talbert, Jr.
Attorney—Pennie, Edmonds, Morton, Taylor and Adams

[57] ABSTRACT

The alkali content of cement clinker is controlled by recycling a fraction of dust having a particle size larger than 5 to 15 microns recovered from the exhaust gas of the cement kiln cooled to below the precipitation temperature of the alkali.

4 Claims, 2 Drawing Figures

PATENTED FEB 1 1972

3,638,400

INVENTOR
THORBJORN HEILMANN
BY
ATTORNEY

SEPARATION OF ALKALI-RICH DUST FROM CEMENT KILNS

This application is a continuation of application Ser. No. 566,547, filed July 20, 1966, now abandoned.

This invention relates to the manufacture of cement and, more particularly, to the control of the alkali content of cement clinker.

Cement clinker is commonly produced in a plant that includes a rotary kiln in which the raw materials, wet or dry, are successively dried, preheated, calcined, and burnt to clinker, and a dust precipitator, such as an electrostatic filter or a bag filter, to remove suspended dust in the exhaust gas from the rotary kiln. The precipitator is used partly to prevent the dust from contaminating the surroundings and partly to recover at least part of the dust for the cementmaking process. The temperature of the exhaust gas passed to the dust precipitator must be comparatively low to prevent damage of the precipitator. A modern rotary kiln is either equipped with built-in devices serving to increase the heat exchange between the raw materials and the exhaust gas as the exhaust gas flows through the gas outlet end of the kiln or the kiln is coupled to a separate preheater in which the raw materials are preheated by the exhaust gas while the gas temperature is reduced. In both cases, the desired low gas temperature is attained. The precipitated dust normally is returned to the rotary kiln preferably to a point where the physical and chemical nature of the material in the kiln essentially corresponds to that of the dust to increase yield.

Now nearly all cement raw materials contain volatile constituents in the form of alkalis, normally as sulphates and carbonates, and chlorine compounds, and in the calcining and burning stages in the kiln, some of these constituents are volatilized and carried out of the calcining zone in the exhaust gas.

Subsequent cooling to a sufficiently reduced temperature of the exhaust gas will cause solidification of the volatilized constituents therein. A portion of the alkalis is condensed on the raw materials in the preheating and drying zones of the kiln, and a portion is carried out of the kiln with the exhaust gas and appears in the dust precipitator partly as small particles of solidified alkalies and partly as a coating of alkaline compounds condensed onto dust particles. Since at least part of the precipitated alkali-containing dust is normally returned to the kiln to prevent loss of raw materials, a closed alkali circuit is established between the kiln and the precipitator.

In the practical operation of a cement kiln, a high alkali content makes the material adhesive thus tending to cause agglomeration of the clinker into large lumps and adhesion of the clinker on the walls of the kiln. It is well known that it is important to control the amount of alkali that is circulated.

According to the present invention, the alkali content of the cement clinker is controlled by directing the exhaust gas, cooled to a temperature sufficient to cause solidification of the volatilized alkalis, to a precipitator with a view to precipitate the solids in the form of dust from the exhaust gas, and from at least part of the precipitated dust is removed a fraction that has a particle size less than 5 to 15 microns. At least a portion of the remainder fraction of the dust is recycled to the kiln.

The method of this invention may be adapted to use in a plant where a bag precipitator is used. In such instance all the dust recovered must be subjected to a separation treatment to obtain the desired removal of a fine fraction. Since a bag precipitator does not effect any fractional separation by itself, the invention is of particular value when such precipitator is used.

Meanwhile, the precipitation of the solids is preferably effected by electrostatic precipitation carried out in separate zones, because in that case the natural fractional separation of the precipitator may be utilized in combination with the subsequent separation of at least part of the precipitated dust. The dust recovered in the first zones or sections of the electrostatic precipitator is coarse and contains relatively small amounts of alkalis, whereas the dust recovered in the later sections of the precipitator is finer and thus contains a larger portion of solids having a particle size less than 5 to 15 microns. At least part of this latter portion of the dust is subjected to a separation treatment so as to remove therefrom dust with a particle size less than 5 to 15 microns. The remaining coarser dust from the separation may be recycled to the kiln for further burning or at least part of it may be, if desired, returned to the precipitator for renewed treatment. The amount of the recycled dust is selected to control the alkali content of the cement clinker and to achieve optimum yield by preventing excess loss.

The method of this invention achieves the primary object of effectively reducing the alkali content in the kiln so that undesirable agglomeration is prevented. Meanwhile, I found that the dust having a particle size less than 5 to 15 microns has such a high concentration of alkalis that it can be used as a potash fertilizer without additional concentration or other treatment and so the production of such fertilizer from the dust not applicable for cement production forms another object of the invention.

It is important that the separation is carried out so that a major portion of the fine grain dust having a size less than 5 to 15 microns is removed from the precipitated dust, and so a separator capable of carrying through a sharp separation should preferably be used. A suitable type of separator known as such is one in which the separation is effected by centrifugal force exerted on the dust while suspended in an airstream flowing through a flat separating chamber spirally from the outside inwards.

Preferably, the present method is used in a plant where a bank of electrostatic precipitators connected in series is used for dust control. In such a plant, the alkali content of the cement clinker can be controlled to a maximum efficiency.

Figure 2:
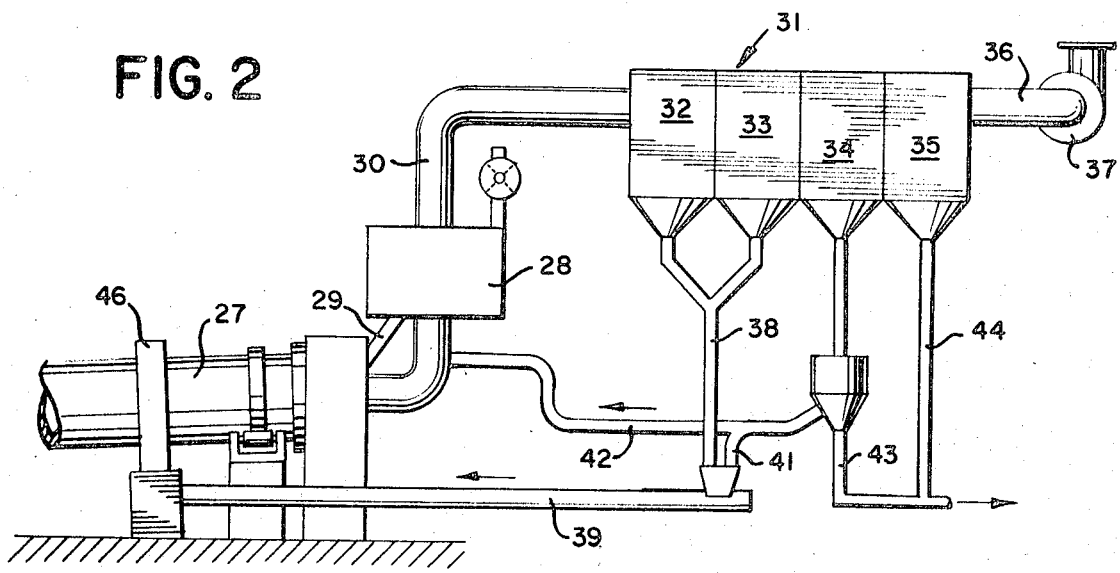

Further to illustrate this embodiment of the invention, it is described hereinbelow with reference to the accompanying drawings wherein:

FIG. 1 is a schematic diagram showing the portion of cement plant used for controlling the alkali content of cement clinker, and FIG. 2 is a modification of the first embodiment shown in FIG. 1.

Referring initially to FIG. 1, the heart of the cement burning plant 10 is a sloping rotary kiln 11, of which only the upper or feed end is shown. Here the raw materials, finely ground and precisely composed to form a dry or wet feed, are fed into the kiln by a feed pipe 12 so as to be eventually burned to cement clinker. The upper end of the rotary kiln is surrounded by a smoke chamber 13 from which a pipe 14 carries the exhaust gas from the burning of the raw materials to a bank of electrostatic precipitators 15. The rotary kiln 11 is a kiln in which the exit or the exhaust gas is used to heat the raw feed shortly after its entrance into the kiln. As a consequence the exit gas has such low temperature that it can be conducted to the precipitators 15 without damaging the same. The temperature, for example below about 300° C., is also sufficient to cause solidification of the volatile alkalis suspended in the gas.

In this specific embodiment, the bank of electrostatic precipitators 15 has four series-connected sections 16, 17 18, and 19. The exhaust gas from the pipe 14 is directed to the first section 16 of the bank of precipitators and, after being stripped of most of the dust in the four sections, is led through a pipe 20 to a smokestack (not shown) to the atmosphere. A fan 21 is used to vent the exhaust gas from the precipitator 19.

The dust precipitated in sections 16 and 17 is rather coarse and contains only a small amount of alkalis. This part is returned to the kiln by a pipe 22 connected to a pneumatic conveyor 23. The dust is introduced into the kiln by means of a scooping device concealed behind a hood 45 at such locality in the kiln where the physical and chemical properties of the raw materials are substantially the same as those of the recycled dust.

The dust from the latter two sections 18 and 19 of the precipitators is finer and contains a substantial portion of alkalis. The recovered dust of these two sections is fed to a separator 24 by a pipe 25. The separator divides the dust into two fractions according to grain size. The finer fraction in which a substantial portion of the dust has a particle size less than from about 5 to about 15 microns is removed by pipe 26. The coarser fraction may be discarded or recycled to the kiln. The finer fraction may be utilized directly as fertilizer.

Referring now to FIG. 2 which shows an alternative embodiment of the cement plant similar to the plant shown in FIG. 1 the rotary kiln 27 is of the short type needing a raw feed preheater 28 partly to preheat the feed that is fed to the kiln by a pipe 29 and partly to reduce the temperature of the exit gas from the kiln 27 by a conduit 30. The preheater 28 is of a conventional type and is only shown diagrammatically in the drawing. Similar to the plant shown in FIG. 1 and described hereinabove, the bank of electrostatic precipitators 31 has four sections 32, 33, 34, and 35. The exhaust gas from the conduit 30 is directed to the first of the series-connected precipitators. The gas after it is stripped off the dust is vented to the atmosphere by exit conduit 36 with the assistance of a fan 37.

Also similar to the plant shown in FIG. 1, the dust collected in the first two sections of the bank of precipitators is recycled to the kiln at 45 by a pipe 38 and a pneumatic conveyor 39. The dust collected in the third section 34 contains a greater amount of fine dust particles than the two first sections and is therefore subjected to a separation treatment by a separator. The coarser fraction may be recycled to the kiln by directing the dust to the conveyor 39 by a pipe 41. Alternatively it may be subjected to the first separation treatment by recycling it within the precipitators. In the latter instance, the dust is fed back to the exhaust gas inlet pipe 30 by means of a pipe 42. The finer fraction containing dust of the suitable particle size less than 5 to 15 microns is removed by a pipe 43. The dust precipitated in the last section 35 is substantially fine dust below the dust range 5 to 15 microns stated above and is also removed by pipe 44 connected to pipe 43.

It is understood that other arrangements of the apparatus can be made without departing from the scope of this invention. For example, the first two sections, 16 and 17, of the electrostatic filter may be left out and a bag filter may replace the last two sections, 18 and 19, thereof. In another alternative, the dust from the first two sections of the precipitator bank may also be subjected to a separation treatment to remove the small amount of finer particles contained therein.

The separator that may be used to advantage in the present invention is well known. Preferably, a type is used in which the separation is effected in a flat separation chamber in which the coarser particles move outwardly due to centrifugal force, whereas the finer particles move inwardly due to air suction. In practice, it is not always feasible to effect a separation so distinct that the finer fraction contains no particles smaller or larger than the specific size, 5 to 15 microns. In the present invention, the reference to the finer fraction therefore should be construed to include dust having particles in the range specified hereinabove in which not more than 20 percent of the particles have a size larger than that specified.

An example of the result obtained is shown by the analysis of dust from a precipitator which was subjected to a separation at a grain size of between 6 and 7 microns. At a feed of 750 kilos per hour, 34 percent was obtained as the coarse fraction and 66 percent as the fine fraction. The two fractions were analyzed with the results given below:

| Components | | Starting Material | Coarse Fraction | Fine Fraction |
|---|---|---|---|---|
| $K_2O$ | Alkali | 13.7 | 3.9 | 18.9 |
| $Na_2O$ | | 0.7 | 0.5 | 1.3 |
| $SO_3$ | | 12.4 | 5.3 | 16.1 |
| Cl | | 1.8 | 0.7 | 2.3 |

The starting material containing from 13 to 14 percent $K_2O$ is not suitable for use as a potash fertilizer nor for return to the kiln since the alkali content, as well as the chlorine content, would give rise to an undesirable internal circulation of alkali and chlorine in the kiln with subsequent operational difficulties. By means of the invention, however, it is possible to obtain from this starting material a finer fraction containing 18 to 19 percent $K_2O$ and a coarser fraction containing 3 to 4 percent $K_2O$. The high $K_2O$ content of the finer fraction is useful as a potash fertilizer. The low $K_2O$ content in the coarser fraction is suitable for being returned to the kiln.

I claim:

1. The method of controlling the alkali content of cement clinker formed by burning in a burning zone cement raw materials containing vaporizable alkalies, comprising the steps of removing a gas containing the vaporized alkalies and finely divided entrained solids from the burning zone, contacting said gas with the raw materials being introduced to said burning zone to heat said materials and to cool said gas to a temperature sufficiently low to cause solidification of the alkalies, thereafter directing the thus cooled gas to successive first and second separation zones and therein separating solidified alkalies and entrained solids from said gas, recovering as least a part of the separated solids separated in the first separation zone and recycling them to said burning zone, recovering the separated solids separated in the second zone, and venting directly to the atmosphere from the second zone the gas which has been deprived of solids; effecting the separation of solidified alkalies and entrained solids from said gas in said separation zones without passing the thus cooled gas through a layer of the raw materials being fed to said burning zone.

2. The method according to claim 1 in which separation of alkalies and entrained solids from said gas is effected by electrostatic precipitation and which includes recovering from at least a part of said solids formed in said second zone a fraction having a particle size of less than from about 5 to about 15 microns, and recycling at least a portion of the remainder fraction of said solids from the second precipitation zone to said burning zone.

3. The method according to claim 1 which includes recovering the solids formed in the second zone, separating from at least a part of said solids a fraction having a particle size of less than from about 5 to about 15 microns, and recycling at least a portion of the remainder fraction to said first zone.

4. A plant for making cement clinker comprising a rotary kiln for burning cement raw materials thereby producing an exhaust gas containing alkalies vaporized from the raw materials, gas discharge means for discharging gas into the atmosphere means for contacting said exhaust gas with raw materials being fed to said kiln to heat said materials and to cool the exhaust gas to a temperature sufficiently low to cause solidification of the vaporized alkalies therein, two groups of means for separating solidified alkalies from said gas interposed between said contacting means and said gas discharge means, means for conveying said gas successively through said separating means, means for fractionating the solids separated from said gas in the first group of separating means into two fractions one of which has a particle size less than from about 5 to about 15 microns, means for recycling at least a portion of the other fraction to the kiln, and said gas discharge means being operatively constructed and arranged fro discharging said gas into the atmosphere from said second group of separating means, and said two groups of means for separating solidified alkalies from said gas being operatively constructed and arranged for effecting the separation of solidified alkalies and entrained solids from said gas in said two groups of means without passing the cooled gas through a layer of the raw materials being fed to said rotary kiln.

* * * * *